United States Patent [19]
Porten et al.

[11] Patent Number: 5,996,059
[45] Date of Patent: *Nov. 30, 1999

[54] SYSTEM FOR MONITORING AN EXECUTION PIPELINE UTILIZING AN ADDRESS PIPELINE IN PARALLEL WITH THE EXECUTION PIPELINE

[75] Inventors: Joshua Porten, Palo Alto, Calif.; Amir Bar-Niv, Givatayim, Israel

[73] Assignee: National Semiconductor Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/886,520

[22] Filed: Jul. 1, 1997

[51] Int. Cl.⁶ .................................................. G06F 9/30
[52] U.S. Cl. .............................. 712/200; 712/42; 714/38
[58] Field of Search .................................. 395/376, 377, 395/800.41, 800.42; 712/200, 201, 41, 42; 714/38, 45

[56] References Cited

U.S. PATENT DOCUMENTS

| | | | |
|---|---|---|---|
| 5,564,028 | 10/1996 | Swoboda et al. ........................ | 395/568 |
| 5,572,690 | 11/1996 | Molnar et al. ........................... | 395/376 |
| 5,600,848 | 2/1997 | Sproull et al. ...................... | 395/800.42 |
| 5,604,878 | 2/1997 | Colwell et al. ..................... | 395/800.42 |
| 5,682,493 | 10/1997 | Yung et al. .............................. | 395/393 |
| 5,704,054 | 12/1997 | Bhattacharya ........................... | 395/388 |

*Primary Examiner*—Richard L. Ellis
*Attorney, Agent, or Firm*—Limbach & Limbach, LLP

[57] ABSTRACT

An address pipeline includes a sequence of registers for storing the memory addresses of instructions currently being processed within the different stages of an execution pipeline. In parallel with the execution pipeline, the address pipeline advances the corresponding memory addresses as the instructions are advanced through the execution pipeline. Address pipelining allows the programmer of a pipelined processor to understand the otherwise hidden operation of a pipelined processor by giving the programmer means to track instructions through the pipeline. In addition, the address pipeline includes an instruction status register for indicating whether an instruction at any given stage of the pipeline has been executed and a program counter address breakpoint register for storing the address of the instruction that actually triggers a breakpoint.

17 Claims, 4 Drawing Sheets

SYSTEM FOR MONITORING AN EXECUTION PIPELINE UTILIZING AN ADDRESS PIPELINE IN PARALLEL WITH THE EXECUTION PIPELINE

BACKGROUND OF THE INVENTION

1. Field of the Invention

The present invention relates to computer processors and in particular, to pipelined processors and machines. More particularly the present invention relates to a method and apparatus for observing and understanding the operational characteristics of different pipelined machines to aid in optimizing their use.

2. Description of the Related Art

A pipelined machine is, for example, a computer processor in which instruction execution takes place in a series of units or stages, arranged so that several units can be simultaneously processing the appropriate parts of several instructions. Two or more of a pipelined machine's stages, such as prefetch, fetch, decode, execute, and write-back, can each simultaneously operate on a different instruction. In other words, pipelining is a method of fetching and decoding instructions (preprocessing) in which, at any given time, several program instructions are in various stages of being fetched, decoded, or executed. Ideally, pipelining speeds execution time by ensuring that the machine does not have to wait for instructions when execution of one instruction is completed, the next is ready and waiting. The DECchip 21064 (also called the DEC Alpha or the DEC Alpha AXP) manufactured by Digital Equipment Corporation of Massachusetts is an example of a pipelined machine.

More particularly, a typical pipeline, like the one found in the DEC Alpha, will have a number of stages that execute different phases of an instruction in parallel. For example, a pipeline may have four stages. The first stage fetches a new instruction, the second decodes the previously fetched instruction, the third fetches any operands that may be required by the previously decoded instruction and finally, the fourth stage executes the instruction after it has been fetched, decoded and all its operands have been fetched. Thus, the four pipeline stages, in this example, are: fetch, decode, operand fetch and execute. This pipeline is called an execution pipeline because it is responsible for executing the programmer's code. General purpose computer processor pipelines have been mentioned, but it should be understood that any instruction based machine, such as a digital signal processor (DSP) or a disk controller, can be pipelined.

Another example of a prior art processor pipeline is the Motorola 68020 Microprocessor manufactured by Motorola, Inc. of Schaumburg, Ill. This processor includes an instruction fetch and decode unit as shown in FIG. 1. This unit provides the mechanism for simultaneous fetch, decode and execution of instructions. The instruction pipeline 2 includes several stages 3, 4, 5, that instructions move through as they are processed. The pipeline 2 is fed by the cache holding register 1 which is merely a buffer between memory and the pipeline 2. The sequencer 6 and the control unit 7 drive the processor including the pipeline 2 in response to the values contained in the various pipeline stages 3, 4, 5. The execution unit 8 is essentially the computational element of the processor. At a given time, the processor may be working on four words of an instruction or four separate word-size instructions.

For instance, the execution unit 8 might contain the results of an instruction that has just been executed, while Stage A 3 may be providing the next instruction to be processed. Stage B 4 may be providing data needed to complete the current instruction, such as an immediate operand. Finally, Stage C 5 might contain a fully decoded and validated instruction ready for execution. The objective of this part of the pipelined architecture is to eliminate the amount of time required in an instruction's execution that represents the fetch and decode operations. This can be achieved because these operations are done in parallel while the previous instruction is still being executed. The desired result of this instruction prefetch and decoding is faster execution of the program.

Ideally, a set of instructions executing on a pipelined machine will function identically to, and run faster than, the same series of instructions executing on a non-pipelined machine. A programmer should be able to expect that if his code first specifies that a certain register is to be read and then the same register is to be written in the next instruction, that is the order that the pipelined machine will execute his instructions. Likewise, if he reverses the order of the instructions, he should be able to expect that the register will first be written and then read. The programmer expects the pipeline to perform his instructions in the sequence he specifies just like a non-pipelined machine would. If this is the case, the pipelining is said to be transparent because it does not introduce any undesirable or unpredictable effects into the execution of the instructions. In other words, the only difference between a non-pipelined machine and a transparently pipelined machine is that the pipelined machine completes instruction execution sooner and thus, gets the job done faster.

Unfortunately, pipelines are not transparent. The reality is that they have side effects and these side effects can cause anomalous results. For example, if two different instruction sequences, i.e. ABC and ACB, logically do the same thing, but when executed on a pipelined machine have different results, then there is a pipeline side effect. This is a problem because it becomes difficult for a programmer to know what to expect when computing a value. Programmers must be able to consistently determine the results of their calculations and to know when these results are available for use in order to effectively program a machine. If the pipeline scrambles the order in which the programmer expects a value to be computed, the program is likely not to function even if the value would ultimately be computed correctly.

Side effects can be even more subtle and hard to detect than execution order problems. For instance, a pipelined DSP machine will typically perform multiple operations per instruction. A DSP that uses an address unit, which includes registers and an arithmetic logic unit (ALU), to calculate the address from where the next operand is to be loaded, is likely to have some side effects. The address unit's registers can be accessed directly with an instruction or indirectly with an increment address pointer instruction. If an instruction such as load accumulator (LACC) with a certain memory operand is to be performed, the operand is fetched from memory and then loaded into the accumulator. But at the same time, on the same instruction line, the DSP can also advance an address pointer, add an offset to the address pointer, and perform various other functions. With all of these different functions of the same compound instruction, it is possible that as a result of a processor design flaw, at least two of the functions will take place at the same stage of the pipeline. Thus, such a compound instruction could cause an undefined result when two functions access the same register during the same stage. Unless this particular scenario has been documented, the programmer can only observe the final effect of the contention and wonder at how it was achieved.

Prior art pipelines are black boxes in which the order of execution of different parts of an instruction is hidden and thus, there are side effects which can only be understood if documented or by trial and error experience.

Another difficult situation that results in side effects occurs when two different instructions, for example, "increment address register one" and "write a new value to address register one", follow one another. A programmer unaware of side effects, would expect that this would not be a problem because even though both instructions access the same register, they are written to be performed sequentially. However, since "increment address register one" is executed in a different stage of the pipeline than "write a new value to address register one" it could very well happen that the two instructions try to access register one at the same time causing a contention with undefined consequences. Unfortunately, due to the complexity of pipelined machines, it is very difficult and costly to fully document them. The number of different permutations of instruction and data sequences that may arise is vast. Thus, it is not surprising that many side effects are usually not documented. In fact, frequently, the nature and complete impact of a pipelining side effect may not be fully understood by the designers of the machine, much less by the users who must program the machine.

It can be difficult to detect pipeline side effects because they often occur after the fact, as a result of many things happening at once. In other words, each stage of the pipeline is simultaneously performing a different function and the consequence of a conflict between two stages might not become apparent until several additional instructions have passed through the pipeline. Prior art pipelined machines do not provide any means to look into the stages of the pipeline to determine how different instructions are handled at the different pipeline stages. Even if a prior art pipelined machine was equipped with a status register, it would be nearly impossible to determine at what point in time, which portion, of which instruction, in which stage of the pipeline, caused a particular status. What is needed then, is a means to simultaneously trace the progress and effect of several instructions as they move through the pipeline so that side effects can be identified and their impact can be accurately determined.

For the pipeline to operate correctly, only the actual instructions that are to be executed (or some form of the instructions) need to be stored in each of the different pipeline stages. The original memory addresses of the instructions are not required for the proper functioning of the pipeline. However, it is the instruction's address that can be used to provide the information required to identify and understand a pipeline side effect. If it was known which instruction was being executed at each phase of the pipeline, a complete picture of the pipeline's operation could be deduced. This information could then be used by the processor's debugger to provide an accurate picture of how any instruction sequence is handled as it moves through the pipeline. The effects of each stage on each instruction could be tracked whether by single stepping through a sequence or by setting breakpoints. What is needed therefore, is a means to provide the programmer with a view into the pipeline's operation. More particularly, what is needed is a means to ascertain which instruction is in which stage of the pipeline at any given time and whether the instructions have executed. Further, what is needed is status regarding the pipeline after a breakpoint has been reached and an indication of which instruction caused the processor to reach the breakpoint.

Beyond debugging a program to avoid any negative or undesired consequences of side effects, programs can be optimized so as to exploit any opportunities that side effects might provide. This is particularly true for applications that have time or space critical requirements. In other words, if a side effect is fully understood, it can be used to reduce the number of instructions required to perform a task, or reduce the amount of time required for performing a task.

Many digital signal processing (DSP) applications are implemented in software, running on a programmable DSP, much like a general purpose processor. However, DSP applications must run with real time constraints, as they must deal with real life signals, such as speech, vision, process control, etc. As the applications become more complex their performance requirements increase. One of the main features of programmable DSPs is their pipeline. The pipeline enables a DSP to achieve high throughput, executing complex (multiple) operations at the same rate as the processor's clock. For example, a 40 MHz DSP can execute 40 million MAC (multiply and accumulate) instructions per second.

One of the programmer's challenges is to write code that optimally uses the unique operational characteristics of the pipeline in order to gain the benefits of the DSP's maximum possible performance. This task is complicated by the presence of pipeline side effects. As described above, a pipeline's operation is not always transparent to the programmer in terms of the code he writes. Further, as with the pipeline for a general purpose processor, the DSP pipeline's operation is not visible to the DSP programmer (i.e. there are no registers that provide information on the pipeline's operation). Only its effects on the code are observable. In addition, as with general purpose pipelined processors, the pipeline for a DSP is a very complex engine and is therefore very difficult to fully document because there are many different situations that may arise, depending on a specific sequence of instructions and data.

What is needed is a means for the designer of a programmable DSP to help the programmer better understand the pipeline operation and enable him to optimize his code for a given application. It should be understood that although performance is of particular interest to DSP and real time programmers, the present invention described below is applicable to any pipelined machine or processor. In addition, providing visibility into the pipeline may also assist the processor's architects and designers to debug and improve the pipeline's operation.

SUMMARY OF THE INVENTION

The above and other objects of the invention are achieved by the present invention of an address pipeline in a pipelined machine. The present invention provides a means for the programmer to observe a pipeline's operation and obtain information useful for optimizing code accordingly by making the operation of the pipeline visible. It also enables processor designers to debug and improve the pipeline design. The present invention provides an address pipeline that operates in parallel to the main execution pipeline, a register that indicates which instruction from within the pipeline triggered a breakpoint, and a status register that indicates whether or not each of the execution pipeline phases has been executed.

In accordance with a first embodiment of the present invention, an address pipeline in the form of a secondary pipeline structure in parallel with the execution pipeline, is provided to sequentially store the memory addresses of instructions as they move through the different stages of a pipeline. The address pipeline includes one register for each corresponding stage of the execution pipeline. The execution pipeline control signal used to trigger the advance of instructions through the execution pipeline is used to also advance corresponding addresses through the address pipeline. Pipeline control logic generates a status signal for each pipeline stage which indicates whether the instruction currently in a particular stage has been executed. The present invention includes an instructions status register that stores the present state of each stage's status signal. Finally, the present invention includes a register for storing the memory address of the instruction that triggered a breakpoint.

In accordance with a second embodiment of the present invention, an addressable, first-in-first-out (FIFO) shift register file is provided to sequentially store the memory addresses of instructions as they move through the different stages of a pipeline. The pipeline control signal used to trigger the advance of instructions through the pipeline is also used to clock the corresponding addresses through the shift register file. As with the first embodiment, pipeline control logic generates and stores a status signal for each pipeline stage which indicates whether the instruction currently in a particular stage has been executed. Finally, this second embodiment of the present invention also includes a register for storing the memory address of the instruction that triggered a breakpoint.

These and other features and advantages of the present invention will be understood upon consideration of the following detailed description of the invention and the accompanying drawings.

DETAILED DESCRIPTION OF THE PREFERRED EMBODIMENT

The present invention provides a second pipeline, called an address pipeline, added in parallel to the execution pipeline of the processor. This address pipeline stores the addresses of the instructions that are currently in the pipeline. The address pipeline has the same number of stages as the execution pipeline and is advanced at the same time as the execution pipeline. Each stage of the address pipeline stores the memory address of the corresponding instruction in the execution pipeline. The address pipeline is readable so that a programmer (or debugger) may read out its values.

Figure 1:
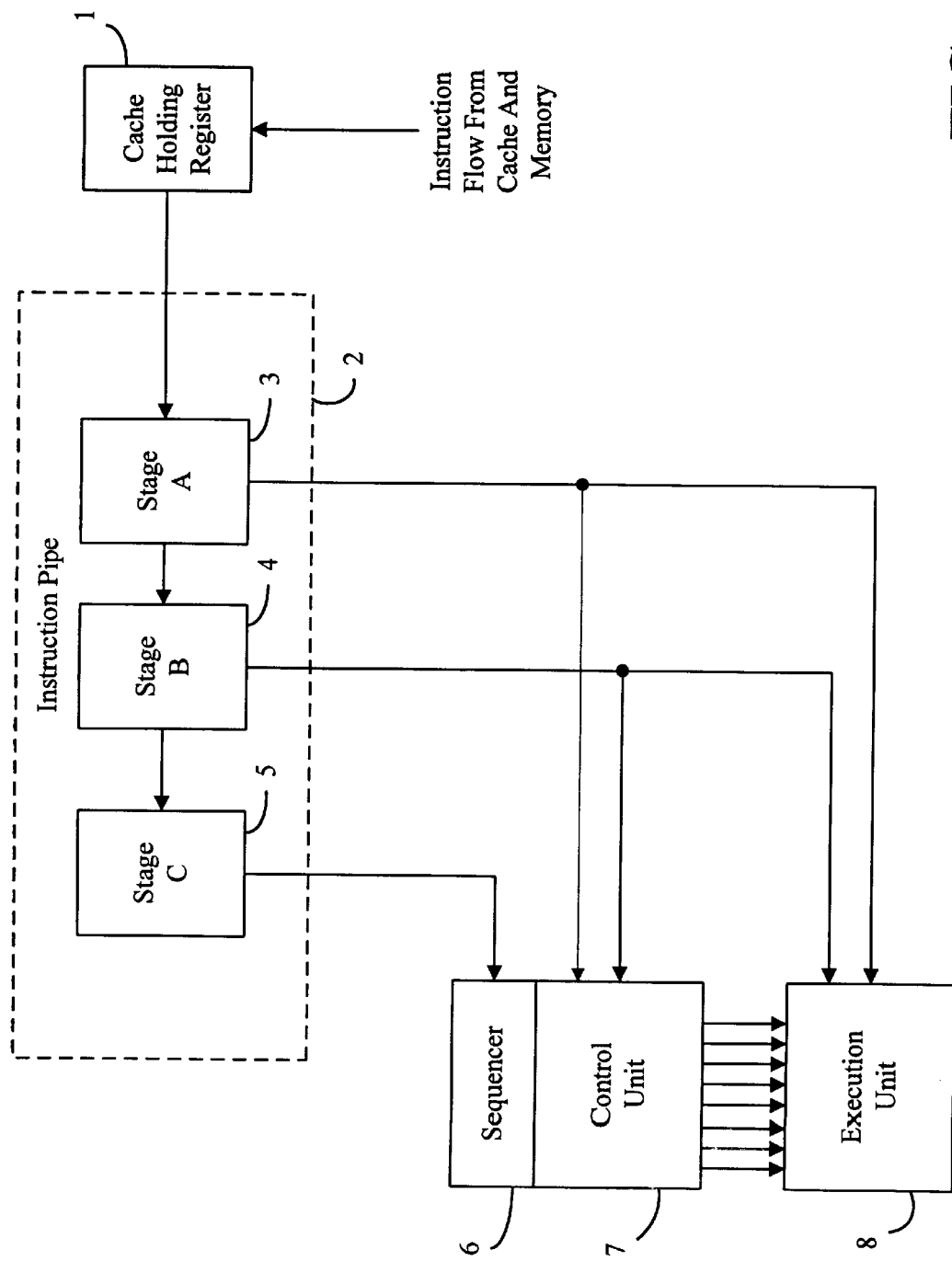
FIG. 1 is a block diagram depicting a prior art pipelined processor.
Figure 2:
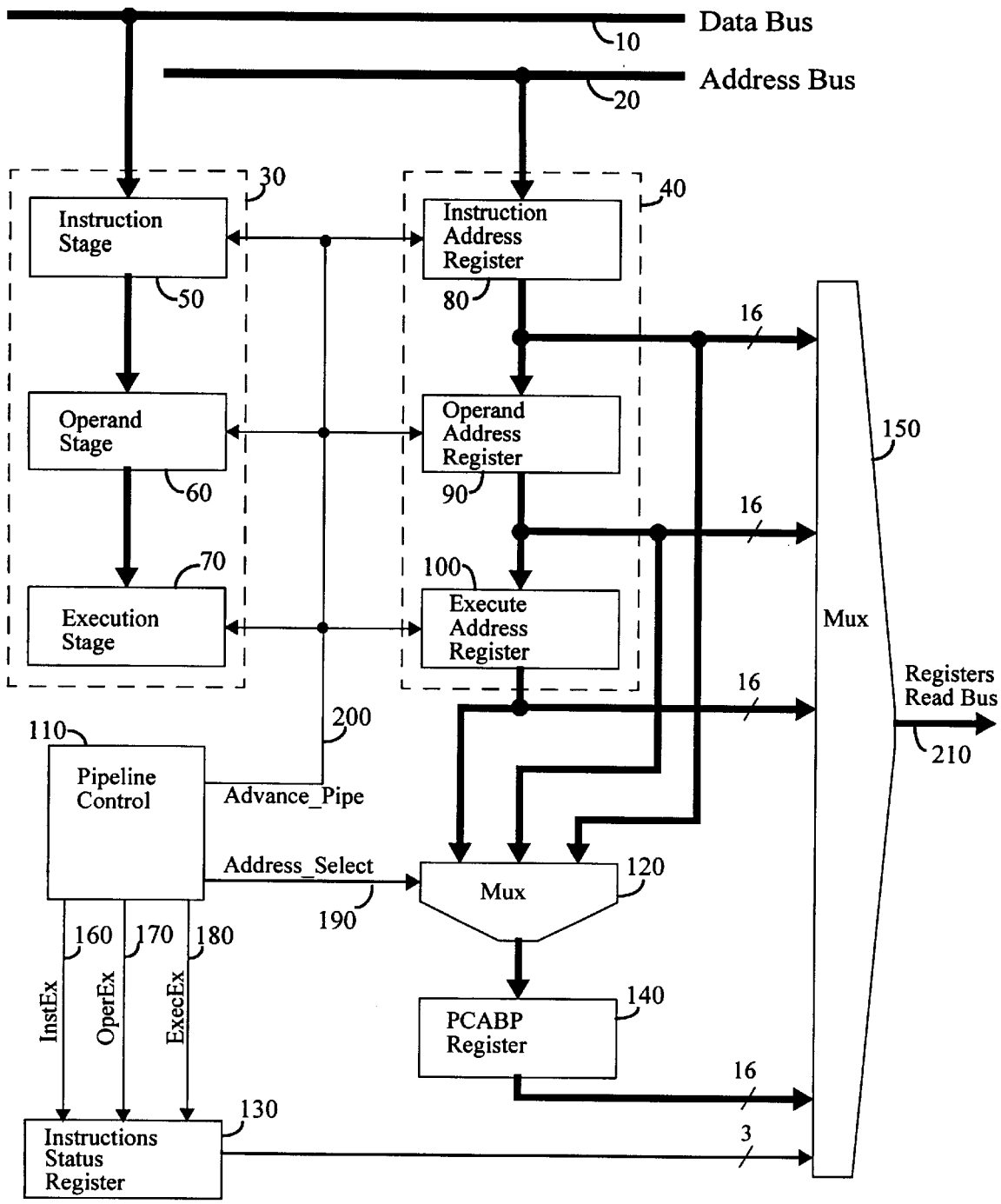
FIG. 2 is a block diagram depicting a three-stage pipelined processor, including a first embodiment of an address pipeline, according to the present invention.

Turning to FIG. 2, an illustration of a three stage pipeline 30 system including an address pipeline 40 is depicted. The execution pipeline 30 reads instructions from the data bus 10. At the same time, the address pipeline 40 reads the memory addresses of the instructions from the address bus 20.

The three stage execution pipeline 30 depicted in FIG. 2 includes an instruction stage 50, an operand stage 60, and an execution stage 70. Although the pictured embodiment labels the various execution stages with particular functional names, it should be understood that the various stages will depend upon the particular pipeline processor that is to be enhanced by the present invention. Likewise, the particular number of stages will vary from pipeline implementation to implementation and, as will be seen in FIG. 3 and the accompanying text below, the address pipeline of the present invention is scaleable to accommodate any number of pipeline stages.

The address pipeline 40 includes an instruction address register 80 which corresponds to the instruction stage 50 of the execution pipeline 30, an operand address register 90 which corresponds to the operand stage 60 of the execution pipeline 30, and an execute address register 100 which corresponds to the execution stage 70 of the execution pipeline 30. As instructions advance through the execution pipeline 30, their corresponding memory addresses advance through the corresponding registers 80, 90, 100 of the address pipeline 40. That is to say, an instruction read from the data bus 10 will move from the instruction stage 50 to the operand stage 60 and then from the operand stage 60 to the execution stage 70 as it is processed. At the same time, the memory address of the instruction will be read from the address bus 20 to the instruction address register 80, and when the instruction moves from the instruction stage 50 to the operand stage 60, the memory address will be moved from the instruction address register 80 to the operand address register 90. Likewise, when the instruction is moved from the operand stage 60 to the execution stage 70, the memory address will be advanced from the operand address register 90 to the execute address register 100. The registers 80, 90, 100 of the address pipeline 40 are wide enough to accommodate the size of the system's memory addressing requirements. A sixteen bit wide address pipeline 40 is shown as an example of a typical width.

The Advance_Pipe signal 200, generated by the pipeline control 110, is the signal used to indicate that the instructions are to be moved to the next stage of the execution pipeline 30. This signal, or its functional equivalent, is a generic signal found in all pipeline systems. It is asserted when the execution pipeline 30 has completed all of its operations in the current cycle for all of the stages 50, 60, 70 and the instructions can be advanced. In other words, the Advance_Pipe signal 200 is asserted when the instruction in the execute stage 70 has been executed, the operand required in the operand stage 60 has been read, and the instruction in the instruction stage 50 has been decoded. The present invention uses the Advance_Pipe signal 200 to trigger the advancement of the memory addresses through the address pipeline 40 as well as for triggering the advancement of instructions through the execution pipeline 30. Thus, the Advance_Pipe signal 200 is fed to each of the address registers 80, 90, 100, as well as each stage 50, 60, 60 of the execution pipeline 30. In this way, the memory addresses in each of the address registers 80, 90, 100 of the address pipeline 40 are kept in synchronization with the instructions in each of the corresponding execution pipeline stages 50, 60, 70.

Another aspect of the invention provides for reading the memory addresses being transferred between the various address registers. A multiplexor 150 allows addressable access to the values being transferred between the address registers. The user or a debugger system can access the desired information via the multiplexor 150 which transfers the selected address register value onto the registers read bus 210. In addition to the memory addresses, the present invention also makes the status of each stage 50, 60, 70 of the execution pipeline 30 available via the instructions status register 130.

A debugger enables the programmer to single step through his program or to set a breakpoint. The programmer may set a breakpoint at a certain instruction or he may specify a certain condition that will halt the processor's execution (e.g. break if address X has been accessed). In either case, the programmer will want to know when exactly did the breakpoint occur (i.e. which instruction actually triggered the breakpoint).

If a breakpoint is set on a certain instruction, the processor will break when that instruction has reached the execution phase. However if a condition was set, the processor will break when that condition has been met. This may not be during the execution phase. Therefore, an additional register is needed that will store the memory address of the instruction that actually caused the processor to halt. This register is called a PCABP (program counter address breakpoint) register 140.

Upon reaching a breakpoint, the pipeline control 110 signals a multiplexor 120 via an Address_select signal 190 to select the stage that caused the breakpoint to be reached. If the instruction that caused the processor to halt is currently in the execution stage 70, then the PCABP register 140 will latch the content of the execute address register 100. Likewise, if the instruction that caused the processor to halt is currently in the operand stage 60, then the PCABP register 140 will latch the content of the operand address register 90. If the instruction that caused the processor to halt is currently in the instruction stage 50, then the PCABP register 140 will latch the content of the instruction address register 80.

In addition to knowing the memory address and current stage of the instruction that caused the processor to halt, the programmer may want to know whether each of the phases of the execution pipeline 30 succeeded in completing before the processor was halted. This is facilitated by a set of status signals 160, 170, 180, one per pipeline stage, that are generated by the pipeline control 110. These signals indicate whether the corresponding stage 50, 60, 70 in the execution pipeline 30, completed execution. The state of the status signals 160, 170, 180 are stored in an instructions status register 130.

In the embodiment of the present invention depicted in FIG. 2, the instructions status register 130 stores three bits. Each bit corresponds to an instructions status signal 160, 170, 180 that indicates whether the corresponding phase of the execution pipeline 30 has been executed. The ExecEx signal 180 indicates whether the instruction currently in the execute stage 70 has executed, the OperEx signal 170 indicates whether the operand specified in the operand stage 60 has been fetched, and the InstrEx signal indicates whether the instruction in the instruction stage 50 has been decoded.

For example, assume there is a conditional break set on a read operation that has been triggered by an instruction currently in the operand stage 60. Further assume that within the same pipeline cycle (e.g. before the next Advance_Pipe signal 200 is asserted) the instruction currently in the execute stage 70 has not been executed because it is a conditional instruction and the condition has not been met. Finally, assume that the instruction currently in the instruction stage 50 has not been decoded because the previous instruction is a branch instruction and the pipeline 30 is going to be flushed. In this case, the instructions status register 130 would hold the binary value "010" which immediately indicates to the programmer (or debugger) that the instruction in the execution stage 70 has not been executed, the instruction in the operand stage 60 has fetched the operand, and the instruction in the instruction stage 50 has not been decoded.

Figure 3:
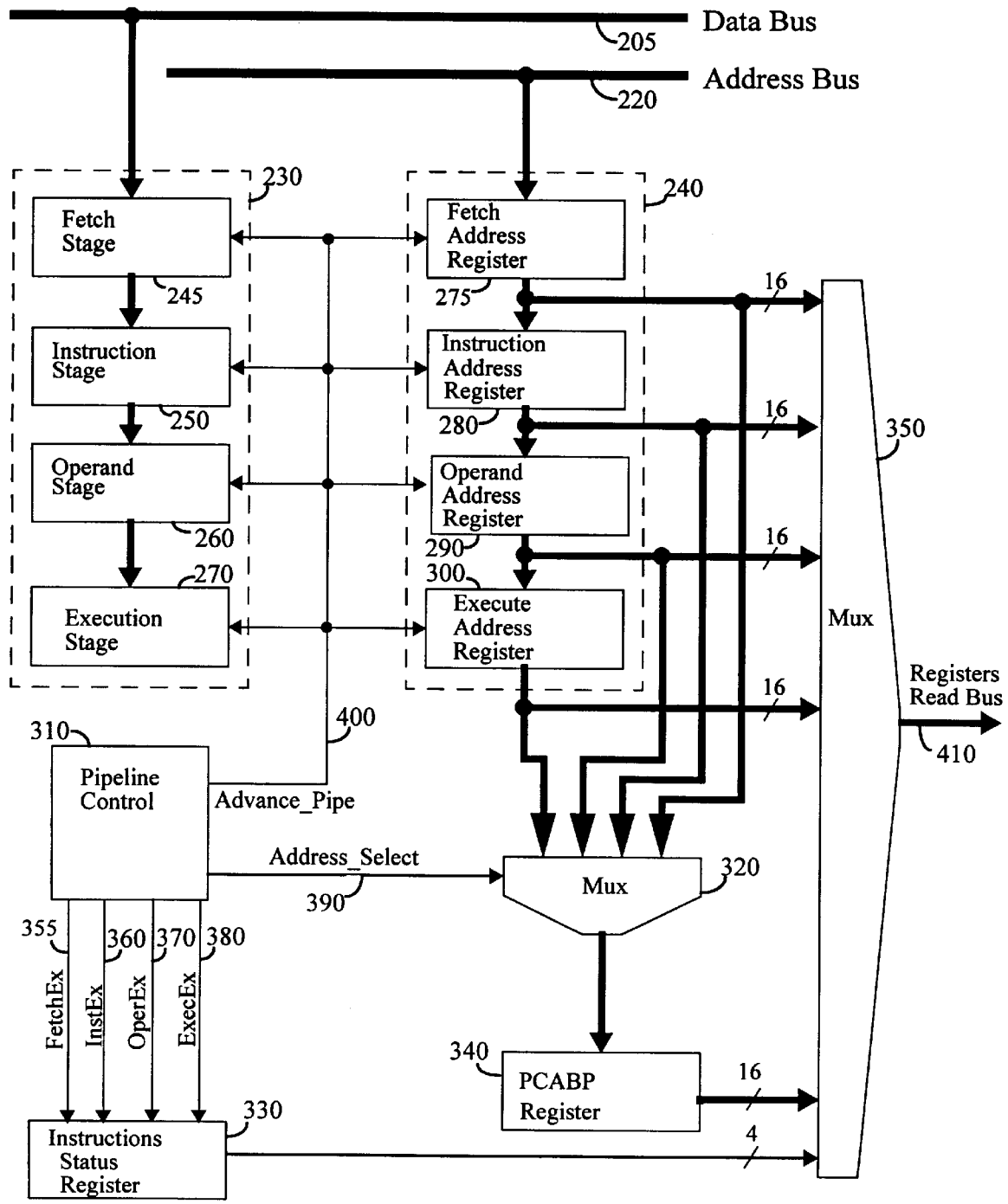
FIG. 3 is a block diagram depicting a four-stage pipelined processor, including a second embodiment of an address pipeline, according to the present invention.

Turning now to FIG. 3, the address pipeline 240 of the present invention is depicted scaled up to accommodate a four stage execution pipeline 230. As mentioned previously, the address pipeline 240 of the present invention easily scales to any number of pipeline stages. The fetch stage 245 of the execution pipeline 230 has a corresponding fetch address register 275 (and associated access bus) in the address pipeline 240 and the system functions the same way that the three stage system does. The only other significant change from the three stage pipeline system of FIG. 2 is that an additional status signal, FetchEx 355, has been added to feed the instructions status register 330 to handle the additional fetch stage 245. The FetchEx signal 355 simply indicates whether a new instruction has been fetched. Otherwise there are no other differences between the present invention configured for a three stage versus a four stage pipeline. Likewise, the present invention can be scaled to work with any number of stages simply by adding more address registers, status signals, and the associated support hardware.

Figure 4:
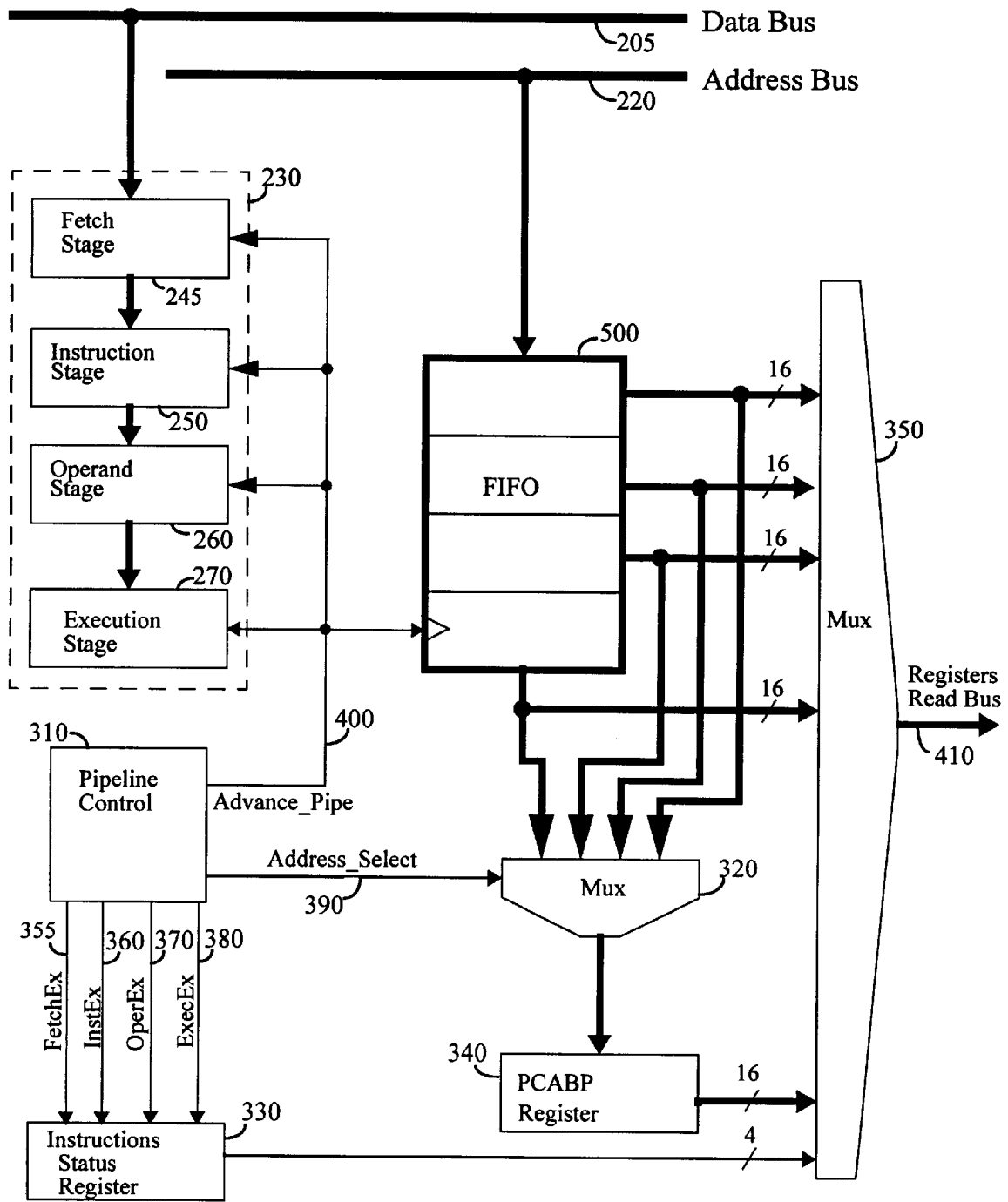
FIG. 4 is a block diagram depicting a pipelined processor, including a third embodiment of an address pipeline, according to the present invention.

FIG. 4 depicts another embodiment of the address pipeline 500 of the present invention. In this embodiment, the separate address registers are replaced by an addressable first-in-first-out (FIFO) shift register file. This embodiment operates in a manner similar to those of the previous embodiments. The primary difference is that of hardware implementation.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A pipelined processor comprising:
   an execution pipeline having a plurality of stages and a pipeline control circuit;
   an address pipeline for sequentially and synchronously storing instruction identifiers, in parallel with the execution pipeline and including at least one individually accessible corresponding storage device per stage of the plurality of stages of the execution pipeline; and
   an address breakpoint register coupled to the storage devices of the address pipeline for storing the instruction identifier of an instruction that satisfies a predefined condition upon being executed.

2. The pipelined processor of claim 1, wherein said instruction identifiers are sequential instruction identifiers for tracking individual instructions through the pipeline.

3. The pipelined processor of claim 1 further comprising an instruction status register coupled to the pipeline control circuit for storing status signals indicative of an execution status of each stage of the plurality of stages of the execution pipeline.

4. A pipelined processor comprising:
   an execution pipeline for processing instructions;
   means for sequentially and synchronously storing instruction identifiers corresponding to each of the instructions processed in the execution pipeline; and
   means for accessing the instruction identifiers within the means for sequentially and synchronously storing, wherein the means for sequentially and synchronously storing includes a sequence of registers and wherein the means for accessing includes a multiplexor configured to select from among the sequence of registers.

5. The pipelined processor of claim 4, wherein said instruction identifiers are sequential instruction identifiers for tracking individual instructions through the pipeline.

6. The pipelined processor of claim 4 wherein the sequence of registers is a first-in-first-out register file.

7. The pipelined processor of claim 4 further comprising means for storing status signals indicative of an execution status of each the instructions being processed in the execution pipeline.

8. A pipelined processor comprising:

an execution pipeline for processing instructions;

means for sequentially and synchronously storing instruction identifiers corresponding to each of the instructions processed in the execution pipeline;

means for accessing the instruction identifiers within the means for sequentially and synchronously storing; and an address breakpoint register, coupled to the means for sequentially and synchronously storing instruction identifiers, for storing the instruction identifier of an instruction that satisfies a predefined condition upon being executed.

9. An address pipeline for a pipelined processor including an execution pipeline having plurality of stages for processing instructions and a pipeline control circuit, the address pipeline comprising:

an electronic storage device having a sequence of storage locations and at least one storage location corresponding to each stage of the plurality of stages of a pipeline, wherein each storage location of the sequence of storage locations is individually addressable, operable to store a value, and configured to shift the value to the next storage location in the sequence of storage locations upon receipt of a pipeline advance signal, and wherein the values relate to instructions and the address pipeline further comprises an address breakpoint register, coupled to the storage locations, for storing the value related to an instruction that satisfies a predefined condition upon being executed.

10. The address pipeline of claim 9, wherein said value is a sequential instruction identifier for tracking individual instructions through the pipeline.

11. The address pipeline of claim 9 further comprising an instruction status register coupled to the pipeline control circuit for storing status signals indicative of an execution status of each stage of the plurality of stages of the execution pipeline.

12. A pipelining method of processing instructions comprising the steps of:

executing instructions in a pipelined processor;

sequentially and synchronously storing instruction identifiers corresponding to each of the instructions processed in the execution pipeline; and accessing the instruction identifiers within the means for sequentially and synchronously storing, wherein the step of sequentially and synchronously storing includes the steps of writing the instruction identifiers into a sequence of registers and shifting the instruction identifiers along the sequence of registers as the instructions move through the pipeline, and wherein the step of accessing includes selecting a register from among the sequence of registers using a multiplexor.

13. The pipelining method of claim 12, wherein the instruction identifiers are sequential instruction identifiers for tracking individual instructions through the pipeline.

14. The pipelining method of claim 12 wherein the sequence of registers is a first-in-first-out register file.

15. The pipelining method of claim 12 further comprising the step of storing status signals indicative of an execution status of each the instructions being processed in the execution pipeline.

16. An address pipelining method for use within a pipelined processor including an execution pipeline having plurality of stages for processing instructions and a pipeline control circuit, the address pipelining method comprising the steps of:

storing a sequence of values within an electronic storage device having a sequence of storage locations and at least one storage location corresponding to each stage of the plurality of stages of a pipeline;

shifting the sequence of values to the next storage location in the sequence of storage locations upon receipt of a pipeline advance signal; and accessing, individually, a value within one of the storage locations, wherein the values relate to instructions and the address pipelining method further comprises the step of storing the value related to an instruction that satisfies a predefined condition upon being executed in an address breakpoint register, coupled to the storage locations.

17. The address pipelining method of claim 16 further comprising the step of storing status signals indicative of an execution status of each stage of the plurality of stages of the execution pipeline in an instruction status register coupled to the pipeline control circuit.

* * * * *

UNITED STATES PATENT AND TRADEMARK OFFICE
CERTIFICATE OF CORRECTION

PATENT NO. : 5,996,059
DATED : 11/30/99
INVENTOR(S) : Joshua Porten ET AL.

It is certified that error appears in the above-identified patent and that said Letters Patent is hereby corrected as shown below:

In Col. 9, line 13, replace "each the" with --each of the--;
In Col. 10, line 25, replace "each the" with --each of the--;
In Col. 10, line 8, replace "storing." with --storing,--.

Signed and Sealed this

Eleventh Day of July, 2000

*Attest:*

Q. TODD DICKINSON

*Attesting Officer*     *Director of Patents and Trademarks*